June 9, 1925. 1,541,107
W. H. BROWN
DUST EXCLUDER FOR INTERNAL COMBUSTION ENGINES
Filed Dec. 5, 1918 3 Sheets-Sheet 1
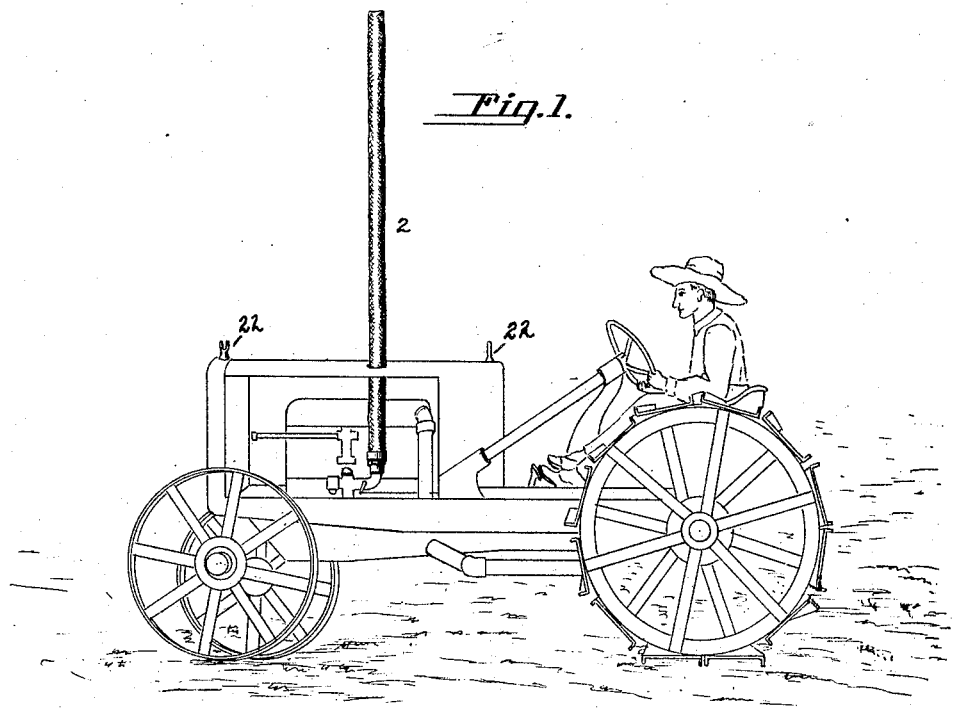
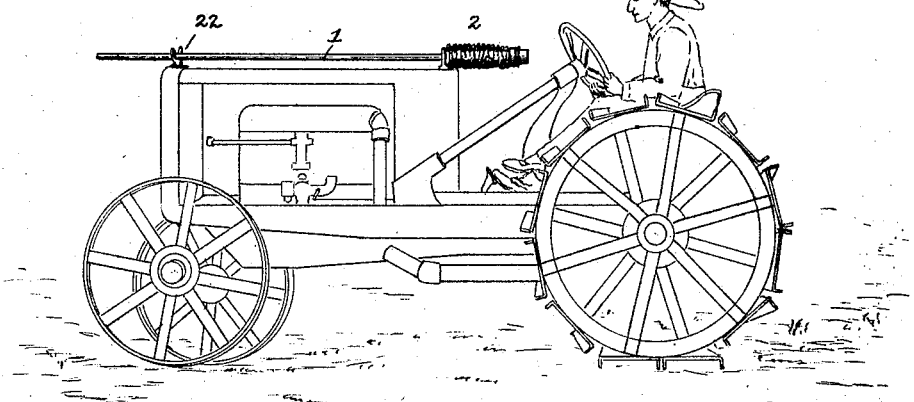

June 9, 1925. 1,541,107
W. H. BROWN
DUST EXCLUDER FOR INTERNAL COMBUSTION ENGINES
Filed Dec. 5, 1918   3 Sheets-Sheet 2
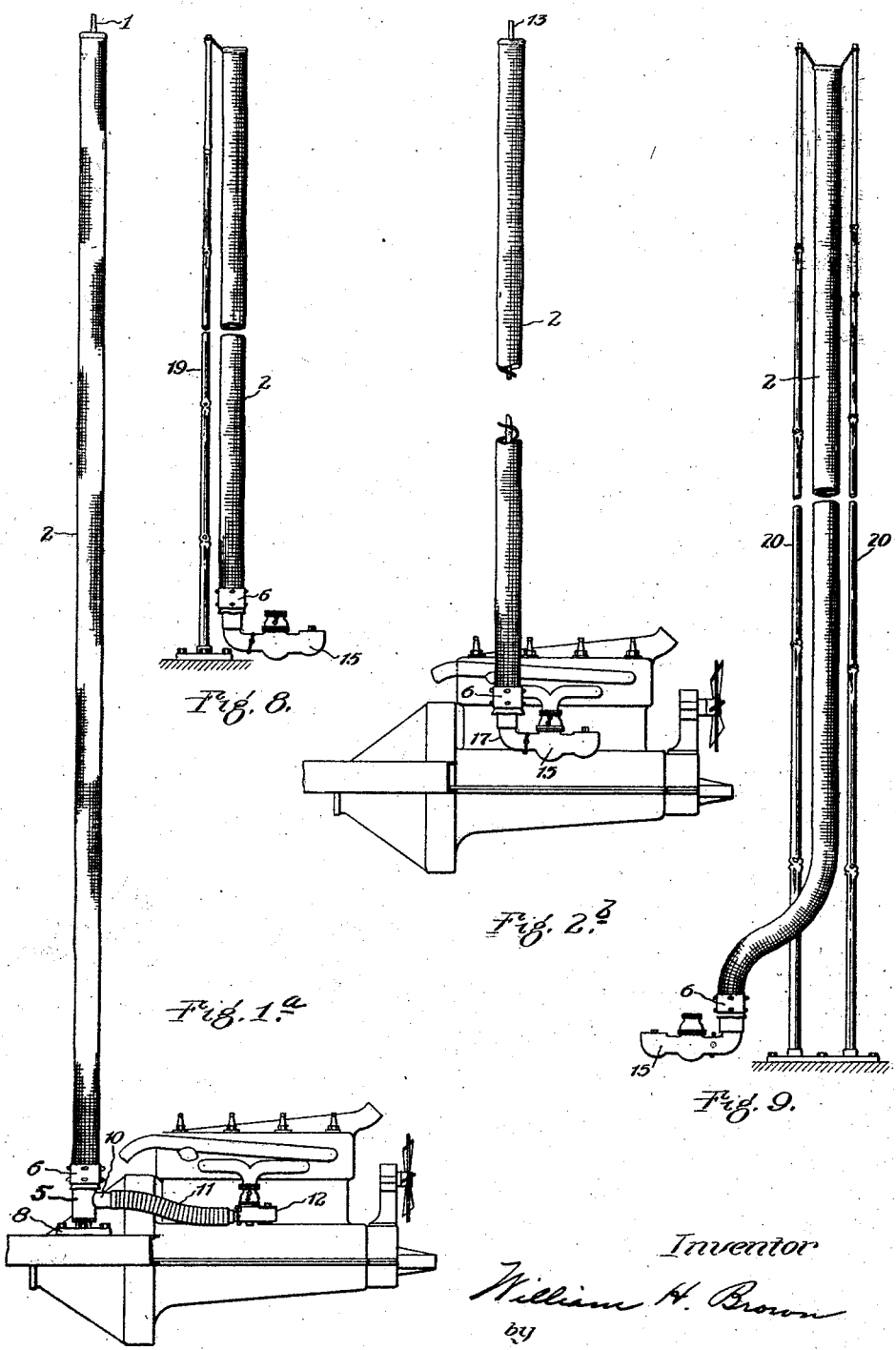
Inventor
William H. Brown
by
Frank L. Sessions
his attorney June 9, 1925.

W. H. BROWN

DUST EXCLUDER FOR INTERNAL COMBUSTION ENGINES

Filed Dec. 5, 1918     3 Sheets-Sheet 3

1,541,107

Inventor
William H. Brown
by
Frank L. Sessions
his attorney

Patented June 9, 1925.

1,541,107

UNITED STATES PATENT OFFICE.

WILLIAM H. BROWN, OF CLEVELAND, OHIO.

DUST EXCLUDER FOR INTERNAL-COMBUSTION ENGINES.

Application filed December 5, 1918. Serial No. 265,380.

*To all whom it may concern:*

Be it known that I, WILLIAM H. BROWN, a citizen of the United States, residing at Cleveland, in the county of Cuyahoga and State of Ohio, have invented certain new and useful Improvements in Dust Excluders for Internal-Combustion Engines, of which the following is a specification.

My invention has for its object the provision of a simple and practical means for supplying dust-free air to the intakes of internal combustion engines while they are being operated in dusty atmospheres. It is particularly advantageous when used in connection with tractor or motor truck engines which, from the nature of the service in which they are employed, often operate almost continuously in extremely dusty atmospheres.

I have observed that while great clouds of dust are raised by tractors and motor trucks, by far the greater portion of the dust, and particularly that portion which is most abrasive in its character rises only a few feet from the ground. That portion of the dust which rises higher is composed of smaller and lighter particles and is less abrasive in its character than that which is found in the stratum of air immediately surrounding the tractor at the height above the ground where the air intake to the engine is ordinarily located.

My invention is designed to exclude the major portion of the dust which would otherwise enter the intake of the engine.

In the embodiment of my invention shown in the accompanying drawings and described herein, there is provided a fabric tube forming an air supply pipe the intake end of which is held aloft above the dust laden zone of air while the lower end of the tube is connected to the air intake of the carburetor which serves the engine. Dust free air is thus continually drawn from aloft into the engine, the dust surrounding the engine at the height above the ground where the air intake is ordinarily located, being entirely excluded by the treated fabric tube.

My invention is fully described in the following specifications and shown in the accompanying drawings in which:

Figs. 1 and 2 are views of my device applied to a tractor;

Fig. 1ª is a side elevation of one of my dust excluders mounted upon the frame of a vehicle and connected through the carburetor to the intake of the internal combustion engine which drives the vehicle;

Fig. 2ᵇ is a side elevation of one of my dust excluders supported upon the carburetor housing and connected through the carburetor to the intake of an internal combustion engine;

Figs. 8 and 9 show modified means for supporting the dust excluder.

Figure 7:
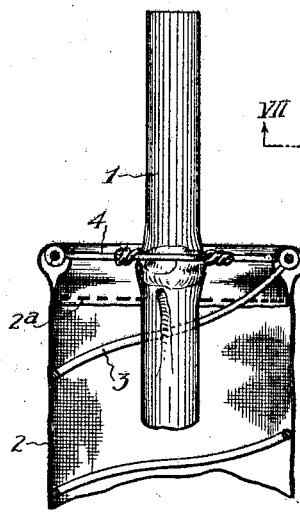
Fig. 7 is a vertical section of the top portion of the dust excluder on line VII—VII of Fig. 6.

Referring to the drawings, 1, represents a vertical mast which, as shown, consists of a bamboo pole but which may be made of any suitable, light, strong material.

Surrounding the mast, 1, is a fabric tube, 2, forming an air intake flue which is reinforced by a helical spring wire coil, 3, which holds the tube laterally distended and permits it to be collapsed or extended longitudinally without closing the flue opening. The dust excluder is thus made adaptable to any height of support up to the full length of the fabric tube.

Figure 6:
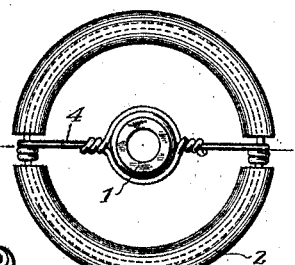
Fig. 6 is a plan view of the mast and flue of the dust excluder.
Figure 5:
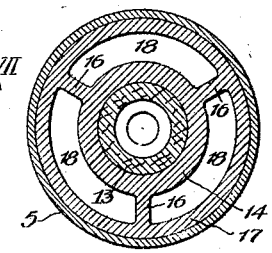
Fig. 5 is a section on line V—V of Fig. 4.
Figure 4:
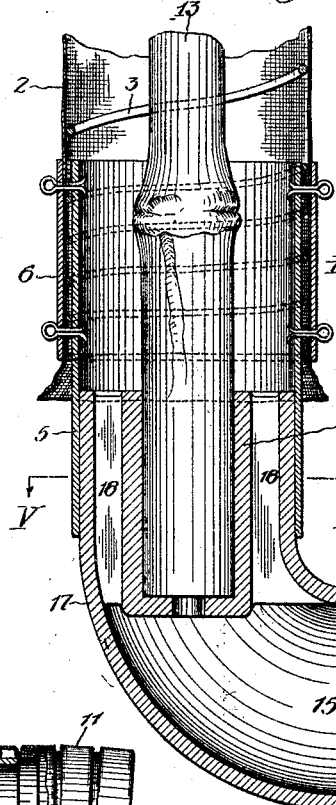
Fig. 4 is a vertical longitudinal section of the lower portion of the dust excluder shown in Fig. 2ᵇ.
Figure 3:
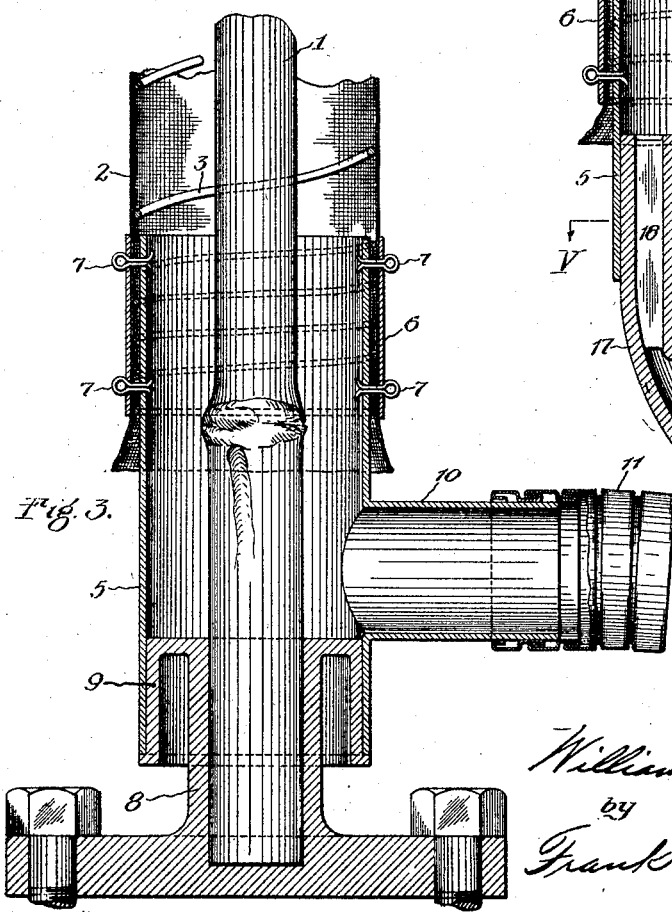
Fig. 3 is a vertical longitudinal section of the lower portion of the dust excluder shown in Fig. 1ª.

The cloth or fabric tube, 2, is open ended at the top, folded over and sewed to the top coil of the reinforcing wire as shown at 2ª, and is held central with the mast, 1, by means of a cross wire or spider, 4, which is attached to the reinforcing wire, 3, and may be tied to the mast, 1, in the manner shown in Figs. 6 and 7. Or, the supporting mast may be outside of the tube and the latter may be hung to the mast as shown in Figs. 8 and 9, or in any other convenient manner.

The lower end of the flue, 2, is fitted with a tubular metal connecting member, 5, which telescopes inside of several convolutions of the reinforcing coil, 3. Over the canvas or fabric tube, 2, which surrounds the connecting member, 5, there is placed another tubular metal member, 6. The tubes, 5 and 6 are removably secured together and to the flue, 2, by means of cotter pins, 7.

In the structure shown in Figs. 1ᵃ and 3, the mast, 1, is removably supported in the socket member, 8, which is bolted securely to the frame and is provided with a cylindrical end portion, 9, for the support and end closure of the tubular member 5. Branching from the tubular member, 5, is the tube, 10, through which air is conducted to the carburetor or air heating stove on its way to the internal combustion engine.

In Fig. 1ᵃ of the drawings, I have shown a flexible metal hose, 11, connecting the outlet tube, 10, of the dust excluder to the carburetor, 12. In the form of my invention shown in Figs. 2ᵇ and 4, the mast, 13, is supported in a socket, 14, which is formed concentric with the air intake of the carburetor, 15, and which is supported by spokes, 16, upon the wall, 17, of the carburetor air intake. Openings, 18, between the spokes, 16, permit the air to enter the carburetor.

It is obvious that other means for supporting my dust excluding flue may be employed. For instance the mast may be outside of the flue as shown at 19 in Fig. 8, or, two or more masts may be employed as shown at 20 in Fig. 9.

The fabric of which the tube, 2, is made may be of any suitable material such as cotton ducking, muslin, or woven tubing. I prefer that it be impregnated or painted with waterproof oil or varnish as such treatment prevents the admission of fine dust particles through the wall of the flue and lengthens the life of the fabric.

The manner of using my invention will be apparent from an inspection of Figs. 1, 1ᵃ, 2, 2ᵇ, 8 and 9. The mast and flue may be made of any desirable or necessary height to carry its top or air-intake end above the dust laden air. Ordinarily from six to ten feet is sufficient. When applied to the air intake of an internal combustion engine in the manner shown and described herein, my invention excludes the abrasive dust which, as is well known, is extremely injurious to such engines, and greatly prolongs the life of the wearing parts and maintains the economy of the engine.

Among the advantages of my invention are simplicity, low cost and adaptability to either new or old engines. The device is light and is easily removed when not needed. The dust excluding fabric tube is flexible and not easily injured by the swaying of the vehicle on which it is carried. The materials of which my invention is made are almost universally available and repairs and replacements can be made quickly and cheaply by unskilled persons. As shown in Fig. 2, the mast with its tube may be detached from the engine intake and compacted on the tractor structure; as one way of compacting the device, I may lay the same in a horizontal position in suitable brackets 22 on the tractor hood, the fabric tube being, as shown in Fig. 2, preferably collapsed in accordion fashion at the lower end of the mast.

Having thus described my invention, I claim:

1. In an internal combustion engine tractor, a dust excluder for the carbureter of the engine comprising an air-supply-pipe longitudinally extensible and collapsible and having its lower-end connected to the intake of the carbureter and its inlet-end extending to a point in the atmosphere above the zone of dust raised by the tractor, and a supporting means for the pipe to hold it aloft in non-collapsed open condition, so that the supply of air for the carbureter is obtained from a point above the usual dust cloud raised by the tractor.

2. In an internal combustion engine tractor, a dust excluder for the engine comprising an air-supply-pipe which is flexible and collapsible and which has its lower-end connected to the intake of the carbureter, a mast mounted on the tractor and extended to a point above the dust raised by the tractor, and means for holding the upper-end of the pipe open and suspended on the upper-end of the mast.

3. In a motor vehicle construction a dust excluder for internal combustion engines comprising a flexible collapsible fabric tube having one end connected to the air intake of the engine and means for supporting its other end aloft above the dust laden air surrounding the vehicle, said supporting means consisting of a mast mounted on the vehicle.

4. A dust excluder for internal combustion engine vehicles comprising a fabric tube having an internal helical wire reinforcement, means for connecting one end of said tube to the air intake of the apparatus it is to serve, and a mast rising from the vehicle for supporting the other end of said tube at a distance from said air intake.

5. In an internal combustion engine tractor, a dust excluder for the engine comprising a collapsible air-supply pipe having its outlet-end connected to the intake of the engine and its inlet-end extending upward to a point in the atmosphere above the zone of dust raised by the tractor, means being provided whereby this tube may be removed from connection with the intake of the engine and compacted on the tractor.

6. In an internal combustion engine vehicle, the combination with the engine and its carbureter of an air supply pipe having one end detachably connected to the air intake of the carbureter and its other end extending to a point in the atmosphere above the zone of dust raised by the vehicle.

7. In an internal combustion engine vehicle, the combination with the engine and its carbureter of an extensible air supply pipe having one end detachably connected to the air intake of the carbureter and its other end extending to a point in the atmosphere above the zone of dust raised by the vehicle.

In testimony whereof I affix my signature.

WILLIAM H. BROWN.